United States Patent [19]

Smither et al.

[11] 3,959,767

[45] May 25, 1976

[54] DATA TRANSMISSION SYSTEM

[75] Inventors: Miles A. Smither; Lawrence E. Trowbridge, both of Harris, Tex.

[73] Assignee: General Electric Company, Fairfield, Conn.

[22] Filed: Aug. 21, 1974

[21] Appl. No.: 499,361

[52] U.S. Cl. .......................... 340/18 P; 340/18 LD; 340/15.5 BH; 340/15.5 DP; 340/15.5 TS

[51] Int. Cl.[2] .......................................... G01V 1/40

[58] Field of Search ........ 340/18 R, 18 LD, 18 CM, 340/15.5 BH, 15.5 DP, 15.5 TS

[56] References Cited

UNITED STATES PATENTS

| | | | |
|---|---|---|---|
| 3,794,976 | 2/1974 | Mickler | 340/18 R |
| 3,863,203 | 1/1975 | Patton et al. | 340/18 CM |

*Primary Examiner*—Maynard R. Wilbur
*Assistant Examiner*—T. M. Blum
*Attorney, Agent, or Firm*—Raymond H. Quist; Allen E. Amgott

[57] ABSTRACT

In one of the embodiments disclosed, apparatus is provided for communicating, in digital form, information from a plurality of analog sources located in a borehole to a location on the surface. A multiplexer is provided with a plurality of inputs for connecting the analog signal output of the data sources to an analog to digital converter in response to a sequence control circuit. The analog to digital converter converts the analog signals to digital data signals. A digital address signal is added to each data signal indicating the source of the data. The digital data signals and their addresses are applied to modulate or vary the power factor of power on a power cable mounted in the borehole. Receiver means is provided at the surface location for recovering the digital data and address signals for use on the surface. These signals may be displayed by display means, stored or used in a computer. Additionally, control signal transmission means for controlling the operation of motors in the borehole is disclosed.

12 Claims, 5 Drawing Figures

DATA TRANSMISSION SYSTEM

The purpose of the above abstract is to provide a non-legal technical statement of the disclosure of the contents of the instant patent application and thus serve as a searching-scanning tool for scientists, engineers and researchers. Accordingly, this abstract is not intended to be used in understanding or otherwise comprehending the principles of the present invention hereinafter described in detail, not is it intended to be used in interpreting or in any way limiting the scope or fair meaning of the claims appended hereto.

BACKGROUND OF THE INVENTION

The present invention relates to a data transmission system. More particularly, the present invention relates to a data transmission system in which data signals from a plurality of data sources within a borehole may be transmitted to the surface by means of a single cable which may be a power cable.

The present invention is particularly useful in the art of drilling boreholes for oil wells and oil well exploration. However, the present invention may be extremely useful in any other type of drilling operation or in any other area where similar requirements are placed on the communication system. During the drilling of boreholes in the earth, such as for oil well exploration, it is highly desirable that information from a plurality of sensing devices be sent to the surface on a real-time basis. This is especially important in making the drilling operation efficient. The present invention enables the information from the borehole to be instantaneously transmitted to the surface. In addition, the present invention enables information from a large number of data sources to be sent to the surface on a real-time basis. The sending of this information from a plurality of data sources or monitoring instruments enables adjustments to be made in the drilling operation instantaneously, such as a change in the direction of the drilling of the borehole.

Typical systems in the past used photographic devices to make photographic recordings of instrument readings in the well borehole. Such prior systems of obtaining instrument readings on the surface proved to be highly inefficient since they required the retrieval of the photographic equipment and a delay in developing the film before the information was available on the surface to make a decision with respect to adjustments in the drilling operation. The present invention overcomes these problems and provides real time information to the surface from a plurality of data sources.

DESCRIPTION OF THE PRIOR ART

U.S. Pat. No. 3,657,694, which names James M. Lindsey as the inventor, discloses a data insertion system in which data from an instrument in a borehole is transmitted to the surface by placing pulses or spikes on a conductor supplying line power from the surface to the instrument system in the borehole. However, Lindsey does not disclose a system in which data signals or information from a plurality of data sources within the borehole may be transmitted on a single power cable. Furthermore, the structure disclosed by Lindsey is completely different from that of the present invention.

SUMMARY OF THE INVENTION

An advantage of the present invention is that it provides a means of communicating information from a plurality of data sources in a borehole to a spaced location via a single channel cable.

Another advantage of the present invention is that it eliminates the need for data conductors or cables in addition to a power cable thereby reducing cost and increasing the reliability of the system.

Another advantage of the present invention is that it provides a means of communicating data from a plurality of sources in a borehole to a spaced location on a real time basis.

Another advantage of the present invention is that it provides a means of controlling a plurality of motors located within the borehole without the use of additional conductors or cables. These boreholes are often in excess of 20,000 feet deep and the elimination of additional conductors or cables results in a significant cost reduction in the cost of materials. The elimination of control cables also increases the reliability of the system. This is especially so since the power cable is of heavier construction than control conductors in order to carry the larger currents in power transmission and is therefore much less subject to breakage.

Another advantage of the present invention is that the power wave form on the power cable is not distorted in the transmission of data over the power cable.

Another advantage of the present invention is that the data from a plurality of data sources within the borehole may be applied to a computer for on-line analysis and/or displayed at a plurality of locations on an on-line or real-time basis.

Briefly, in accordance with the present invention, apparatus is provided for communicating information from a plurality of data sources located in a borehole to a spaced location. Multiplexer means is provided in the borehole. The multiplexer means has a plurality of inputs adapted to receive input signals from the plurality of data sources. The multiplexer means connects selected ones of the plurality of inputs to its output in response to signals provided by a sequence control circuit means. The sequence control circuit means also provides address signals to the data which address signals correspond to the selected input (or data source) of the multiplexer means.

Means is provided for applying the output signal of the multiplexer means and the address signal to a cable mounted in the borehole. In a preferred embodimennt, this means varies the power factor or phase angle of the power on a power cable located in the borehole. The data and address signals on the cable are received at a control unit means located at the spaced location which may be on the surface. The control unit means includes means responsive to the address and data signals to provide an indication of the information received from the various data sources.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

Figure 1:
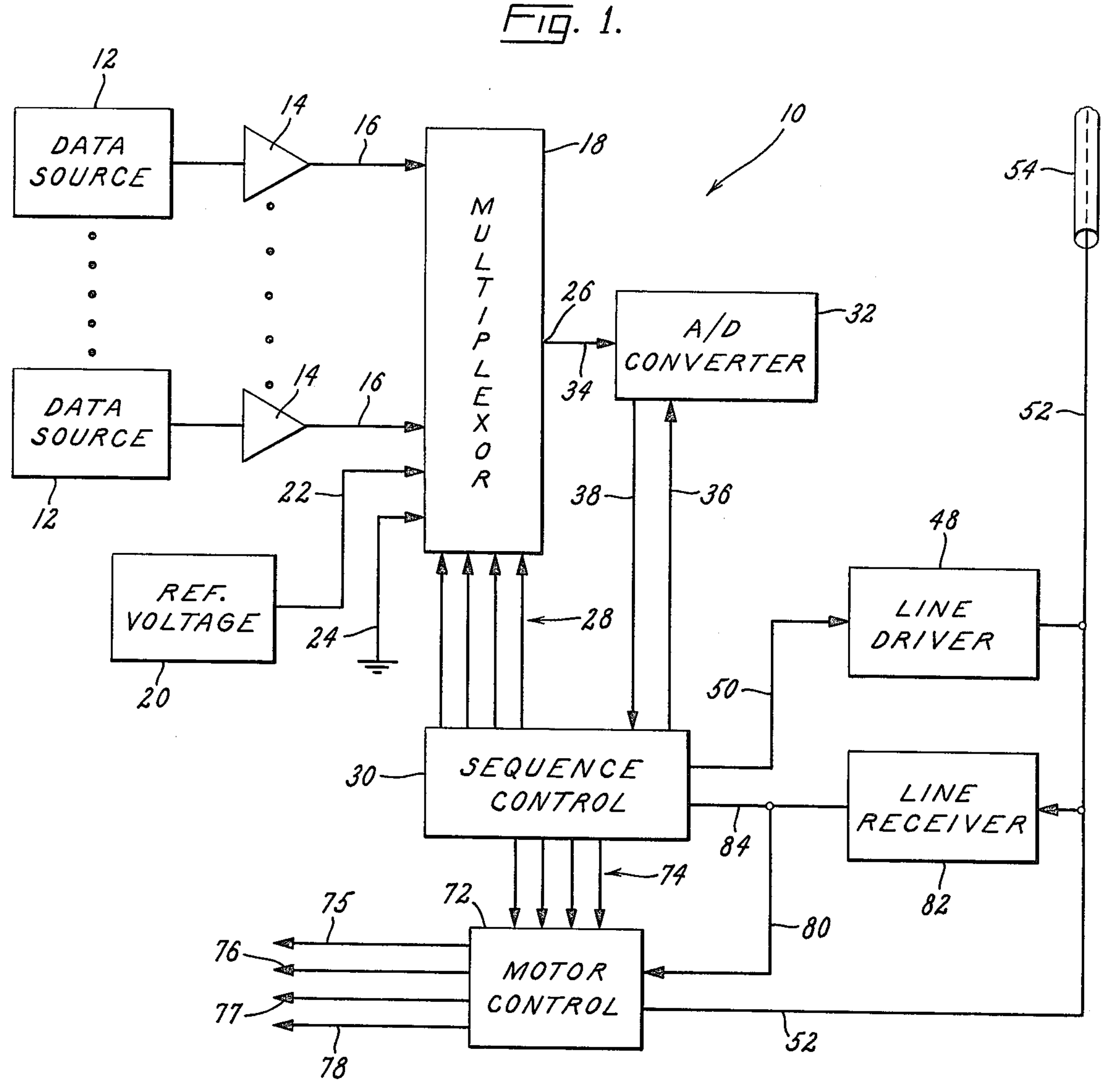
FIG. 1 is a schematic diagram, in block diagram form, of the downhole portion of the data transmission system in accordance with the present invention.

DESCRIPTION OF THE PREFERRED EMBODIMENTS:

Referring now to the drawings in detail, there is shown in FIG. 1 the downhole portion of the data transmission system depicted generally at 10. A plurality of data sources are shown at 12. In a preferred embodiment, ten such data sources are used. However, any suitable number of data sources may be used in connection with practicing this invention. The outputs of the data sources are amplified by amplifiers 14 and applied to inputs 16 of multiplexer 18. A reference voltage source 20 is connected to an inpput 22 of multiplexer 18. A ground potential is applied to input 24 of multiplexer 18.

Multiplexer 18 is constructed in a conventional and well known manner so that output 26 of multiplexer 18 may be connected to any one of the inputs 16, 22 or 24 of multiplexer 18. Depending upon the signals present on lines 28 from sequence control circuit 30 the signals on lines 28 represent address signals which address one of the inputs 16, 22 or 24 of multiplexer 18 thereby selecting the output of a particular data source 12 or reference potential to be applied as an input to analog to digital converter 32.

Figure 5:
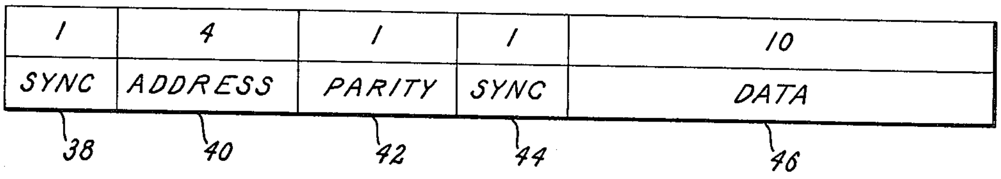
FIG. 5 is a diagram of a signal component structure which may be used in accordance with the present invention.

Analog to digital converter 32 converts the analog signal present on its input 34 when an enable signal is present on line 36 from sequence control circuit 30. The digital signal output of analog to digital converter 32 is fed to sequence control circuit 30 via line 38. Sequence control circuit 30 supplies the digital data signal output of analog to digital converter 32 with an address signal corresponding to or identifying the data source 12 which has been selected by the multiplexer 18 in response to the signals present on lines 28. Sequence control circuit 30 may also supply synchronization or sync bits and a parity bit to form a signal format as shown in FIG. 5. In a preferred embodiment, the signal format shown in FIG. 5 may be utilized. The signal format shown in FIG. 5 is comprised of a sync bit identified at 39, four address bits identified at 40, a parity bit identified at 42, a sync bit identified at 44 and ten data bits identified at 46. The message sequence of transmission would preferably be in the order of 39, 40, 42, 44 and then 46. However, any other suitable message transmission format may be used. Furthermore, the message format may eliminate the use of sync and parity bits.

The message format, as shown in FIG. 5, including a digital address signal and a digital data signal are fed to line driver circuit 48 from sequence control circuit 30 via line 50. Line driver circuit 48 places the signal on cable 52. In a preferred embodiment of the present invention of a data transmission system, cable 52 is the power transmission system supplying line power to the instruments in the borehole. This eliminates the use of additional cables or cables commonly referred to in the art as multiconductor cables. Cable 52 may preferably be a single heavy conductor for carrying considerable or heavy currents and may be provided with a coaxial armor shown at 54 which serves as the return conductor.

Figure 3:
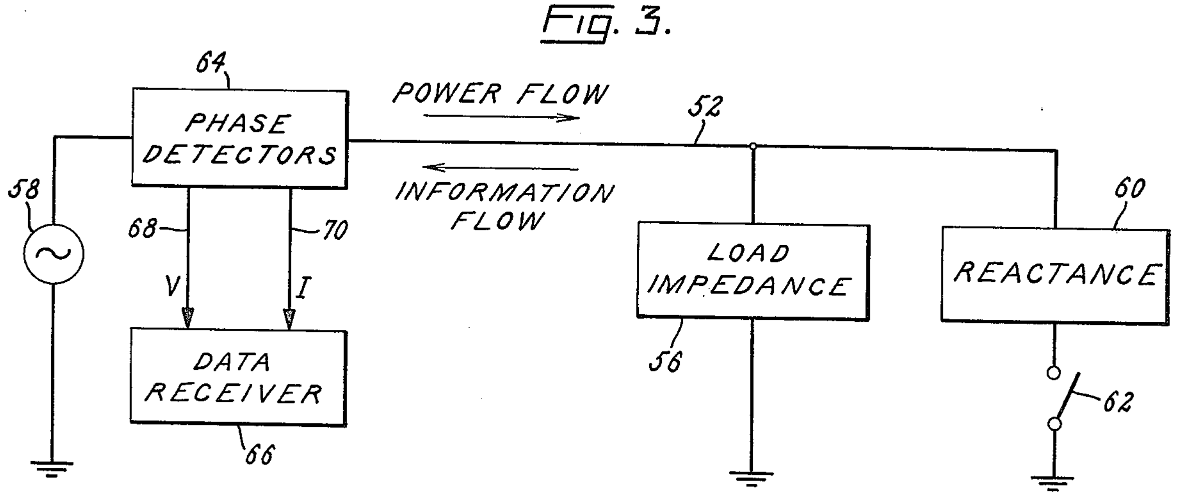
FIG. 3 is a schematic diagram, in block diagram form, illustrating a means of power factor variation or phase angle modulation of power on a power cable which may be used in the data transmission system of the present invention.

Line driver 48 may preferably modulate the power flow on cable 52 by varying the power factor or phase angle of the power as illustrated in FIG. 3. Briefly, in order to understand a preferred embodiment of line driver 48, reference may be had to FIG. 3 wherein a load impedance 56 is supplied power from a source of alternating current potential 58 via a cable 52. A reactance 60 is connected in series with a switch 62 and the series combination of reactance 60 and switch 62 are connected in parallel across load impedance 56. Load impedance 56 has essentially a power factor of one or in other words approximately a zero degrees phase angle. In other words, the voltage across load impedance 56 and the current through load impedance 56 are approximately in phase. Switch 62 may of course be any suitable type of switch, such as a solid state switching circuit which is activated in response to a digital signal. The opening and closing of switch 62 in accordance with or in response to a digital signal causes the power factor or phase angle of the power on cable 52 to vary in accordance with the digital signal. For example, when switch 62 is closed, the power factor may be a predetermined amount below a power factor of one or in other words have a predetermined angle other than zero. When switch 62 is open, the phase angle on cable 52 is approximately zero degrees and the power factor on cable 52 is approximately equal to one.

These phase angle variations or power factor variations may be detected by phase detectors 64 and data receiver 66. Phase detector 64 may be any suitable type of device for detecting the phase of the voltage and current on the line. For example, the phase detector 64 may be simply a voltage divider network from the cable 52 to ground wherein a portion of the voltage on cable 52 is detected and provided via line 68 to data receiver 66. Phase detectors may also include a small resistance connected in series with cable 52 and the voltage across this resistor monitored in order to obtain a signal indicative of the phase of the current through cable 52. This signal would be supplied to data receiver 66 via line 70. Data receiver 66 is a suitable device for indicating that the current and voltage are either in phase or out of phase by a predetermined amount. In other words, if data receiver 66 indicated that the voltage and current were in phase, this may be interpreted to mean the transmission of a digital data zero. If the current and voltage were out of phase by a predetermined amount, this may be interpreted to be a digital data one. However, it is understood that these interpretations could be reversed by convention.

Returning now to FIG. 1, line driver 48 may be comprised of a reactance connected in series with a switch driven in response to the digital signals present on line 50. The reactance and switch in line driver 48 may be connected between the cable 52 and a reference potential. However, line driver 48 may be any other suitable means for modulating the power on cable 52. More generally, line driver 48 may be a modulation type circuit for applying the signal to cable 52 in a case ing on strip chart recorder 124.

Lines 126 and 128 carry control signals between load control 104 and computer 118. Line 126 may be used to carry an interrupt signal from load control circuit 104 to computer 118 which indicates that the load control circuit has digital information for transmission to computer 118. This causes computer 118 to interrupt its other functions and receive the digital information. Line 128 carries a signal from computer 118 to load control 104 which indicates that the computer has received the digital information from load control circuit 104. Although various suitable computers may be used for computer 118, a Varian 620-L-001 mini computer has been found to be suitable for use as computer 118. However, it is understood that various other computers may be used.

Load control circuit 104 provides address and data digital information to display means 130. Load control circuit 104 supplies digital address information to address decode circuit 132 via lines 134. Address decode circuit 132 may be provided with means for selecting the address of the data source of information to be displayed. This may be conventional digital switch type means used in conjunction with the address decode circuit. The address decode circuit enables the register and readout unit 136 to be enabled to receive new data from load control circuit 104 via line 138. The readout portion of register and readout unit 136 may be used to display either the data information alone with reference being made to the address selected on address decode circuit 132 or the readout unit may display both the address and the data. The information supplied from load control circuit 104 via line 138 is stored in the register portion of register and readout unit 136 and may be continuously displayed until new information is supplied by load control circuit 104 having the address which has been selected by address decode circuit 132. Lines 134 and 138 may extend as indicated by arrows to provide address and data information to other display units similar to display means 130.

Load control circuit 104 also provides digital information via line 140 and amplilfier 142 for use at other remotely located control units.

Now, with respect to the motor control functions, the address information from shift register 96 is provided to motor channels decode circuit 110 via lines 108 and inputs 112. As previously described, in the specific embodiment of the invention utilizing four motor control words or motor address signals, these four words contain all zeros in the data bit positions. These motor address signals are used by sync detector 92 to synchronize the data transmission system. In addition, these four motor control words or motor address signals are used by motor channels decode circuit 110 to select one of the lines 151, 152, 153, or 154, each of which contain a switch connected in series in the line. The switches in lines 151–154 may be selectively operated, manually or by other circuit means, to select energization of one or more of the motor lines 75–78 in FIG. 1. As previously indicated, the lines 75–78 may be used to energize four separate motors or may be used to energize two motors, each in two directions. Alternatively, any combination of these functions may be used depending upon the requirements within the borehole.

If one or more of the switches in lines 151–154 are closed, a signal will be applied to modulator 156 when the address signal corresponding to the closed switch is received by motor channels decode circuit 110. Modulator 156 may also receive signals from motor channels decode circuits located in remote control units via amplifier 161. The output of modulator 156 is applied to power switch 158 via input 160. The power switch 158 also receives line power via input 162 from power control circuit 164. The power control circuit 164 maintains the line voltage constant irrespective of changes in current drawn by the turning on and off of motors down in the borehole. This is important since the borehole may be 20,000 feet deep and changes in current caused by turning motors on and off may cause large changes in the voltage across the resistance and/or impedance of the relatively long line or cable 52. In order to maintain a constant voltage at the load end of cable 52, power control 164 may have to provide large variations in input voltage.

Modulator 156, in response to signals from motor channels decode circuit 110 causes power switch 158 to eliminate a negative half cycle of power by switching off for a half cycle in order to turn on a motor in the borehole. A positive half cycle is eliminated by power switch 158 in response to a signal from modulator 156 in order to turn a motor off.

As an example of the operation of the motor control circuitry, assume that motor line 75 in FIG. 1 corresponds to a switch in line 151 of motor channels decode 110 and also corresponds to the thirteenth word or address signal. When sequence control circuit 30 is generating the thirteenth address signal, this signal selects line 75 and also sends the thirteenth address signal (first motor address signal or motor control word) over cable 52 via line driver 48. This thirteenth address signal or first motor control address signal is received in shift register 96 in FIG. 2 via receiver and clock generator 86. The address signal is applied to motor channels decode via lines 108 and inputs 112 of motor channels decode circuit 110. Assuming that the switch in line 151 has been closed in response to a desire to have the motor on line 75 operate, a signal is sent to modulator 156 causing power switch 158 to delete or eliminate a negative half cycle in the power wave form. If there is no desire to have the motor fed by line 75 operate, then the switch in line 151 would not be closed and modulator 156 would not receive a signal. However, assuming that it is desired that the motor connected to line 75 be operated, the power wave form with the negative half cycle missing is received by line receiver 82. Line receiver 82 detects missing negative half cycles and missing positive half cycles of power. A missing negative half cycle of power indicates that a motor is to be turned on. A missing positive half cycle of power indicates that a motor is to be turned off. In response to the missing negative half cycle of power, line receiver 82 provides a signal on input line 80 to motor control circuit 72 causing the line power on cable 52 to be applied to the selected line 75. Line 75 has been previously selected by sequence control circuit 30. The output of line receiver 82 is simultaneously applied to sequence control circuit 30 via input 84 in order to inhibit further addressing or sequencing by sequence control circuit 30 until the motor is de-energized. In other words, the sequence control circuit 30 will be disabled until line receiver 82 detects a missing positive half cycle in the power wave form. The circuitry would similarly operate to energize the other motor lines 76– 78 when they are addressed by sequence control circuit 30.

where cable 52 does not comprise the power cable in a borehole, i.e., generates a modulated carrier.

The address signals of sequence control circuit 30 are also supplied to motor control circuit 72 via lines 74. Motor control circuit 72 recognizes, in a preferred embodiment, four out of 16 addresses. In other words, sequence control circuit 30 generates in sequence 16 address signals. Twelve of these address signals are recognized or decoded by multiplexer 18 to connect one of its plurality of inputs to its output 26. The remaining four address signals are recognized by motor control circuit 72 to enable lines 75 through 78. In other words, when motor control circuit 72 recognizes or decodes a particular one of these four addresses, one of the lines 75 through 78 are enabled or selected. For example, if line 75 is selected in response to an address signal on lines 74, the motor (or the motor in a particular direction) will be operated if an enable signal is also present on line 80 from line receiver 82. The generation of a signal by line receiver 82 will be discussed in greater detail after the control unit in FIG. 2 has been discussed. Assuming that an enable signal is present on line 80, the power from cable 52 will be supplied to line 75 to energize a particular motor or a particular motor in a particular direction. In other words, line 75 could energize a particular motor in one direction and line 76 could be used to energize the same motor in the opposite direction. Alternatively, lines 75 and 76 could be used to control different motors which are unidirectional.

When an enable signal is present on line 80, the same signal is applied to input 84 of sequence control circuit 30 to disable further addressing by sequence control circuit 30 until the enable signal is removed from line 80 by line receiver 82.

Figure 2:
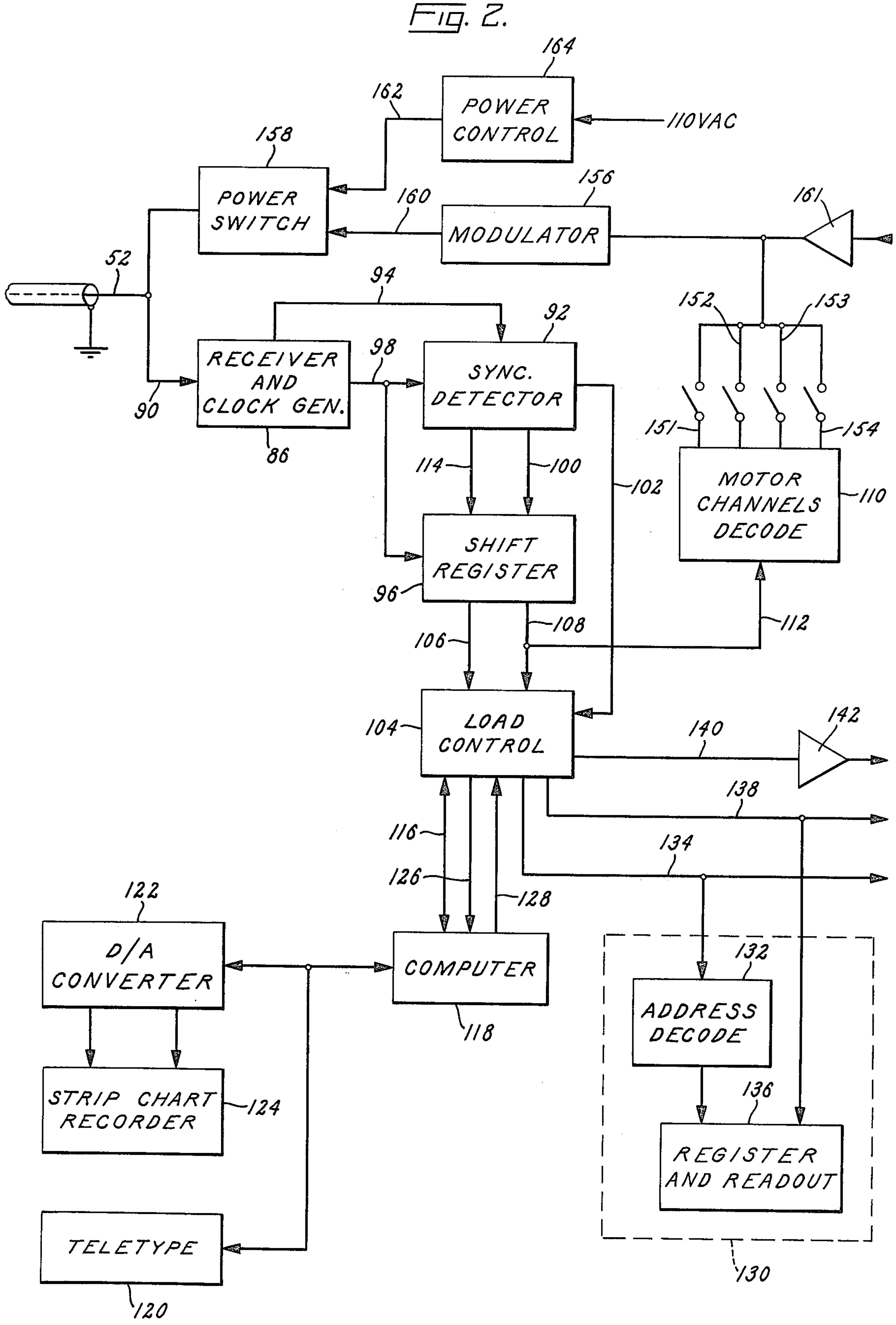
FIG. 2 is a schematic diagram, in block diagram form, of a control unit, which may be located on the surface, in accordance with the present invention.

Referring now to FIG. 2 in detail, there is shown a control unit or receiver means which receives the data from the data sources at a spaced location or in other words at a location on the surface of the earth. The signals on cable 52 are received by receiver and clock generator 86 via input line 90. As indicated, a preferred embodiment of this invention may comprise the use of sixteen addresses and therefore sixteen words. However, it is understood that more or less addresses and words may be used as desired. In the specific embodiment being described, ten of the words and addresses would be used to transmit information from the ten data sources 12. One of the words would be used to transmit the value of a reference potential from reference voltage source 20. Another words and address may be used to transmit the value of ground as it appears on input 24 to multiplexer 18. The ground and reference potential values transmitted to the surface may be used for amplitude calibration or other comparative purposes on the surface. The four remaining words and addresses may be, as described in the disclosed specific embodiment, motor address signals or motor control words. These motor address signals or motor control words may be comprised of addresses and all zero bits for the ten bit data component of the word. Of course, these motor address signals or motor control words may be, and preferably are, provided with sync and parity bits.

The signal received by receiver and clock generator 86 is preferably modulation on a power cable 52. As described previously, this modulation is preferably power factor or phase angle modulation as described with respect to FIG. 3. Receiver and clock generator 86 would preferably include a phase detector 64 and data receiver 66 as described with respect to FIG. 3. In addition, receiver and clock generator 86 would also include suitable means, as is conventional and well known in the art, to generate a clock pulse for each half cycle of the power wave form from cable 52. In other words, for the conventional 60 Hertz power wave form, the clock generator output frequency would be 120 Hertz. The clock signal is applied to sync detector 92 via line 94.

The digital data output of receiver and clock generator 86 is applied to sync detector 92 and shift register 96 via line 98. Sync detector 92 may also be used to eliminate the sync pulses in the data word as shown in FIG. 5. Sync detector 92 may eliminate the sync pulses from the data word by eliminating or deleting the application of a clock pulse to shift register 96 via line 100 when a sync pulse is present on line 98. The clock pulses are normally applied to shift register 96 via line 100 from sync detector 92.

Sync detector 92 may be provided with a bit counter and a zero counter. The bit counter counts the number of bits of information in a data word. If the proper number of bits are counted by the bit counter, such as 17 bits, a data ready signal is placed on line 102 by sync detector 92. When this signal appears on line 102, the digital information, both address and data information, are loaded into a register in load control 104 via lines 106 and 108. Lines 108, which may be four lines in the specific embodiment disclosed, contain the address information and this address information is also applied to the motor channels decode circuit 110 via inputs 112. The motor channels decode circuit 110 will be described below in connection with the control of the motors in the borehole.

Synchronization of the data by sync detector 92 may be accomplished by means of a zero counter which counts up to ten zeros in the specific embodiment disclosed. The zero counter synchronizes the system and resets shift register 96 via line 114 upon the occurence of each motor control word or motor address signal because the ten data bit positions in these signals are always zeros. In addition, this system will be synchronized by any other data word which contains all zeros in the ten data bit positions. Ten zero bits will not occur at any other time due to the presence of the sync bits 38 and 44 in each word as shown in FIG. 5. This precludes a false or improper synchronization signal. The zero counter may also be connected to reset the bit counter whenever 10 consecutive zero bits are received in order to avoid loading such data into load control circuit 104.

Load control circuit 104 may retain the information as received from shift register 96 or it may convert it to another digital form. The digital information, which includes data and address information, may be fed via lines 116 to computer 118. Lines 116 may be comprised of four address lines and 10 data lines. Alternatively, the information could be transferred from load control circuit 104 to computer 118 in serial form. Computer 118 may operate on and analyze this data. In addition, computer 118 may be provided with a memory for storing this data for future use. The data may be transferred from computer 118 back to load control circuit 104. Computer 118 may also provide outputs to and receive inputs from teletype 120. The output of computer 118 may also be supplied to digital to analog converter 122 for use in generating a strip chart recrod- Referring now to FIG. 4, there is shown a circuit means for eliminating direct current offset potentials individually in each of the channels supplying information to the multiplexer. This concept of eliminating the direct current offset potential is associated with each channel of information as claimed in the copending application of Marion M. Ringo which is assigned to the assignee of the present invention.

Figure 4:
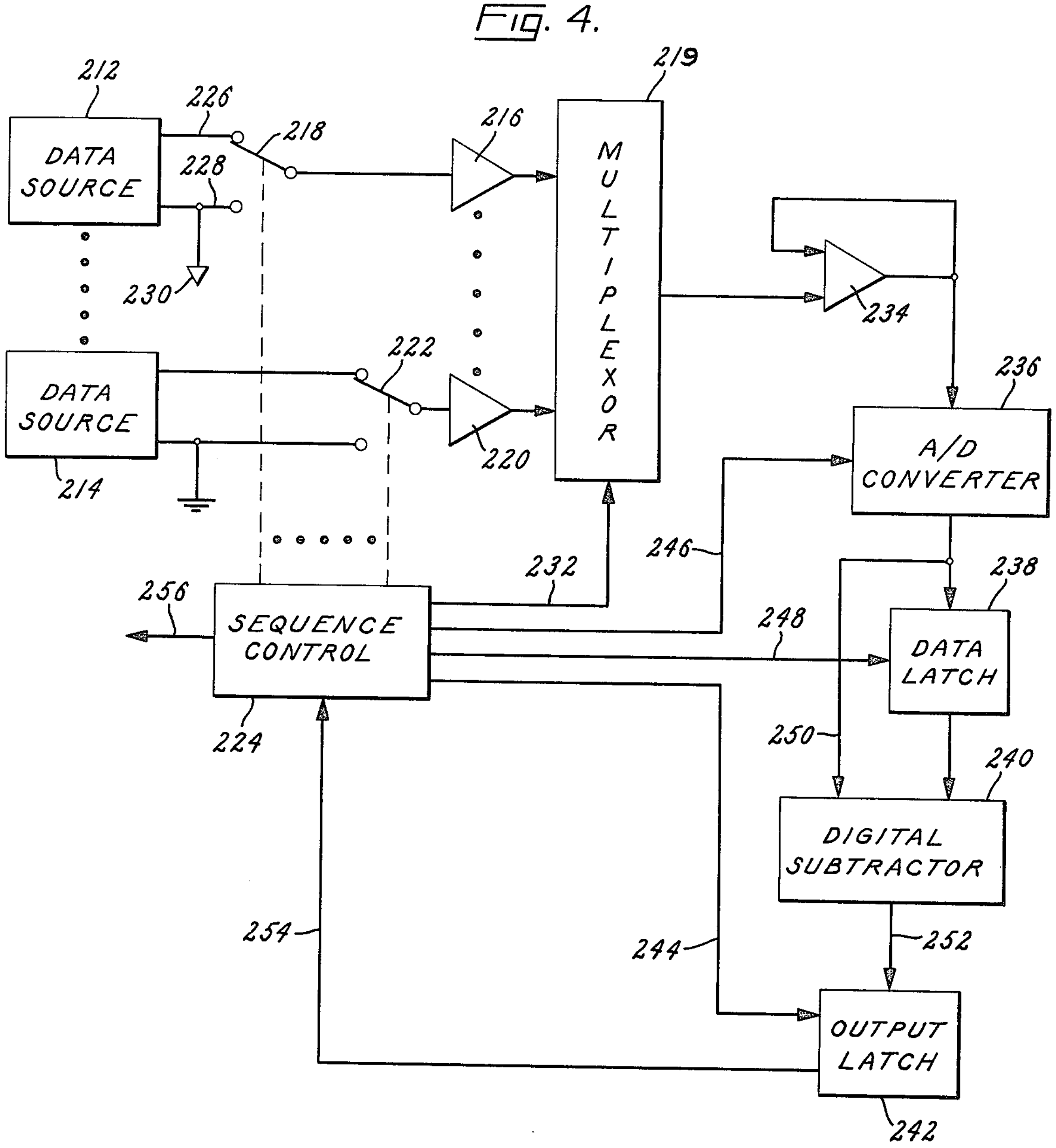
FIG. 4 is a schematic diagram, in block diagram form, of means for eliminating any direct current offset for each individual data source which may be used in the data transmission system of the present invention.

Referring to FIG. 4 in detail, a plurality of data sources are indicated. The two data sources illustrated are numbered 212 and 214. However, it is understood that ten such data sources would be utilized in an embodiment of the invention as shown in FIGS. 1 and 2. The data sources 212 and 214 may correspond to the data sources 12 of FIG. 1.

The output of data source 212 is applied to the input of amplifier or signal conditioner 216 via switch 218. The output of data source 214 is applied to amplifier or signal conditioner 220 via switch 222. Switches 218, 222 and other switches, depending upon the number of channels or sources of data, are operated in response to signals from sequence control circuit 224. It is understood that the switches 218, 220 and others that may be used may be any type of single pole double throw switches, either mechanical, electromagnetic or electronic. Reference will hereinafter be made only to switches 218 and 222. However, it is understood that the system described herein is not restricted two switches or two sources of data.

The switches 218 and 220 are operable by sequence control circuit 224 to select either the signal output or the reference potential output of the particular data sources. In other words, with respect to switch 218, switch 218 as shown is connected to the high side of output line 226 of data source 212. Switch 218 may be connected to terminal 228, which is the reference or ground potential of data source 212. A source of potential 230 is shown connected to terminal 228 in order to indicate that the reference potential of data source 212 may not be at absolute ground potential. However, other inputs being fed into multiplexer 218 may be at a true ground potential such as shown for data source 214.

The outputs of amplifiers 216 and 220 are selected by multiplexer 219 in response to address information from sequence control circuit 224 via line 232 in a manner as described with respect to FIG. 1. The output of multiplexer 219 is fed to a high impedance input device 234 which may be a voltage-follower operational amplifier. The output of operational amplifier 234 is applied to analog to digital converter 236. The output of analog to digital converter 236 is fed into either data latch circuit 238 or digital subtractor circuit 240 depending upon the outputs of sequence control circuit 224. The digital difference signal of digital subtractor 240 is entered into output latch circuit 242 when a signal is present on line 244.

In operation, assuming that sequence control circuit 224 has selected the output of amplifier 216, or in other words the output of data source 212, sequence control circuit 224 first operates switch 218 causing it to be connected to terminal 228. This causes the output of amplifier 216 to have the value of the reference potential present on terminal 228. This value is converted to a digital signal by analog to digital converter 236 when an enable signal is present on line 246 from sequence control circuit 224. The output of analog to digital converter 236, which is a digital signal representing the direct current offset of data source 212, is entered into data latch circuit 238 upon receipt of a signal via line 248 from sequence control circuit 224.

Sequence control circuit 224 then operates switch 218 causing the signal potential on line 226 to be applied to amplifier 216. The signal output of amplifier 216, as processed by operational amplifier 234, is converted to a digital signal by analog to digital converter 236. The output of analog to digital converter 236 is entered into digital subtractor 240 via line 250. The output of analog to digital convertal 236 is not entered into data latch circuit 238 at this time since there is no signal present on line 248. Digital subtractor 240 subtracts the value of the digital signal in data latch circuit 238, which represents the direct current offset potential of the channel represented by data source 212, from the signal potential which was entered into digital subtractor 240 via line 250. The output of digital subtractor 240 is entered into output latch 242 via line 252 when a signal is present on line 244 from sequence control circuit 224. The signal then presents in output latch circuit 242 represents the signal output of data source 212 with any direct current offset potential eliminated. The digital signal in output latch circuit 242 is then supplied to a sequence control circuit 224 via line 254 for the addition of an address signal, and such other parity and sync signals as desired, as described with respect to FIG. 1. The output of sequence control circuit on line 256 is supplied to a line driver circuit as described with respect to FIG. 1.

The operation is repeated in a similar manner for each of the other channels or sources of data. This results in digital data signals on line 256 for each channel, as it is addressed, with each channel having its direct current offset potential compensated for or eliminated.

In view of the above, it will be apparent to those skilled in the art that various changes and modifications may be made within the spirit of the teachings of the present invention. Various forms of modulation and sequence control techniques may be utilized. The word structure and the numerical examples given herein are given solely for the purpose of illustration and are not to be interpreted as limiting the scope of the present invention. It will also be apparent that various changes may be made to the structural arrangement of the components of the data transmission system described herein. Furthermore, it will be apparent that the data transmission system described herein may be used for data transmission from multiple data sources and motor control uses in equivalent applications outside the field of boreholes.

In view of the above, the present invention may be embodied in other specific forms without departing from the spirit or essential attributes thereof and, accordingly, reference should be made to the appended claims, rather than to the foregoing specification as indicating the scope of the invention.

We claim:

1. Apparatus for communicating information from a plurality of data sources located in a borehole to a remote location, comprising: multiplexer means, said multiplexer means being provided with a plurality of inputs and an output, said inputs being adapted to receive input signals from said plurality of data sources, said multiplexer means being adapted to connect selected ones of said plurality of inputs to said output:

means for individually subtracting the direct current offset level from the signal of each data source;

analog to digital converter means for converting the output of said multiplexer means to a digital signal;

sequence control circuit means, said control circuit means providing signals to said multiplexer means for controlling the sequence of connecting said inputs to said output of said multiplexer means and providing an address signal to the data corresponding to the selected input of said multiplexer means;

means for applying the output signal of said analog to digital converter means aad said address signal to a power cable mounted in the borehole; and control unit means located at the remote location, said control unit means including means responsive to the address signal and the data from the data source selected by said multiplexer means to provide an indication of the information from at least one of said plurality of data sources.

2. Apparatus in accordance with claim 1 wherein said means for applying the output signal of said multiplexer means and the address signal to said power cable includes means for varying the power factor or phase angle of the power on said cable in accordance with said signals.

3. Apparatus in accordance with claim 1 including means for applying a reference potential to an input of said multiplexer means thereby enabling transmission of said reference potential value to said control unit means for comparative purposes.

4. Apparatus in accordance with claim 1 including a motor control circuit means, wherein said sequence control circuit means addresses said motor control circuit means and simultaneously provides a motor address signal to said means for applying signals to said cable for transmission to said remote location, means at said remote location for selectively generating a signal to energize said motor control circuit means in response to said motor address signal.

5. Apparatus for communicating in digital form information from a plurality of analog data sources located in a borehole to a location on the surface, comprising:

multiplexer means, said multiplexer means being provided with a plurality of inputs and an output, said inputs being adapted to receive input signals from said plurality of analog data sources, said multiplexer means being adapted to connect selected ones of said plurality of inputs to said output;

means for individually subtracting the direct current offset level reference potential from the digital data signal of each data source prior to applying the signal to the cable, analog to digital converter means, said analog to digital converter means receiving an analog data signal present on said output of said multiplexer means and converting said analog data signal to a digital data signal:

sequence control circuit means, said control circuit means providing signals to said multiplexer means for controlling the sequence of connecting said inputs to said output of said multiplexer means and providing a digital address signal to the digital data output of said analog to digital converter corresponding to the selected input of said multiplexer means;

means of applying the digital data signal output of said analog to digital converter and said digital address signal to a cable mounted in said borehole; and receiver means at said location on the surface for recovering said digital data and address signals for use on the surface.

6. Apparatus in accordance with claim 5 including display means for displaying the digital data and address signals recovered by said receiver means.

7. Apparatus in accordance with claim 5 including a computer means provided with means for storage of digital information, said storage means selectively storing digital data and address signals received from said receiver means.

8. Apparatus in accordance with claim 5 wherein said cable mounted in said borehole is a power cable.

9. Apparatus in accordance with claim 8 wherein said power cable is constructed of a center conductor and an armored outer return conductor.

10. Apparatus in accordance with claim 8 wherein said means for applying the digital data and address signals to said power cable includes means for varying the power factor or phase angle of the power on said power cable in accordance with said digital signals.

11. Apparatus in accordance with claim 5 including means for applying a reference potential to an input of said multiplexer means thereby enabling transmission of the value of said reference potential to said receiver means for comparative purposes.

12. Apparatus in accordance with claim 5 including a motor control circuit wherein said sequence control circuit means addresses said motor control circuit means and simultaneously provides a motor address signal to said means for applying digital signals to said cable for transmission to said receiver means, said receiver means further including means for selectively generating a signal to energize said motor control circuit means in response to said motor address signal.

* * * * *